ns

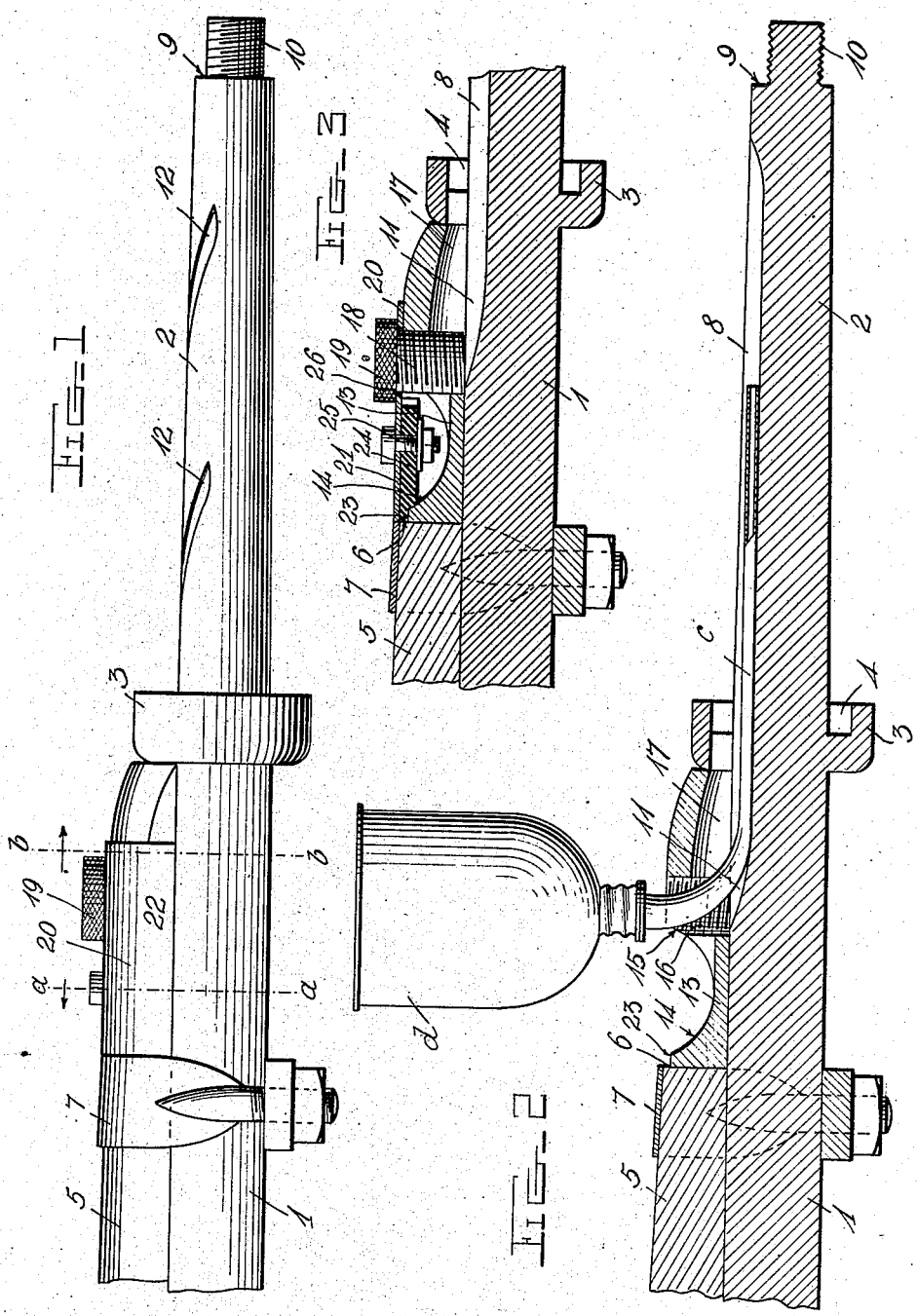

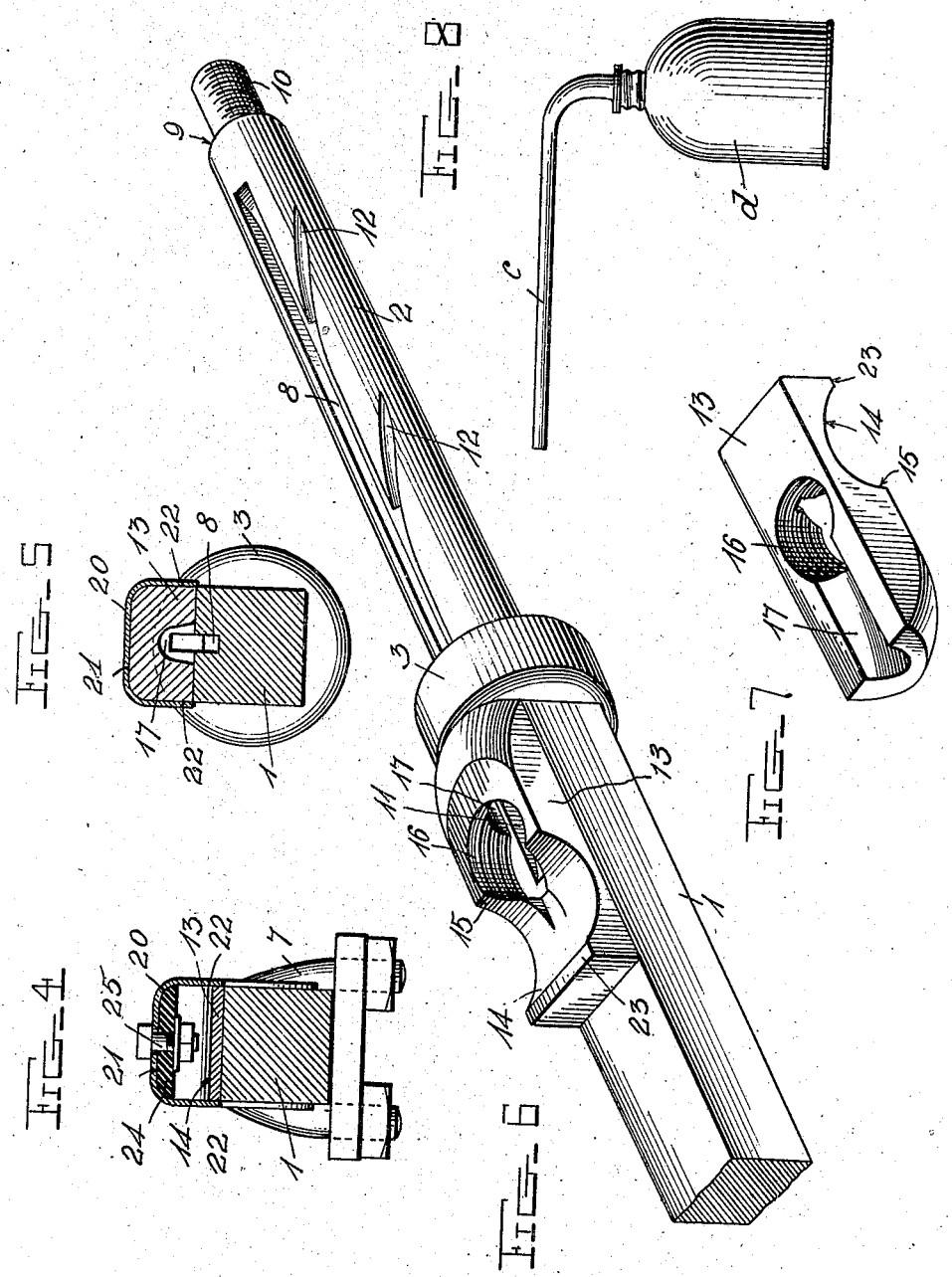

UNITED STATES PATENT OFFICE.

JOSEPH ADEN, OF GREENSBORO, NORTH CAROLINA.

LUBRICATING ATTACHMENT FOR AXLES.

No. 893,122.　　　　Specification of Letters Patent.　　　Patented July 14, 1908.

Application filed March 21, 1907. Serial No. 363,698.

*To all whom it may concern:*

Be it known that I, JOSEPH ADEN, a citizen of the United States, residing at Greensboro, in the county of Guilford and State of North Carolina, have invented certain new and useful Improvements in Lubricating Attachments for Axles; and I do declare the following to be a full, clear, and exact description of the invention, such as will enable others skilled in the art to which it appertains to make and use the same.

My invention relates to improvements in vehicle axles and in lubricating devices for attachment thereto to enable the same to be lubricated by oil or other lubricant applied to the spindles by means of a can or injector, and without the necessity of first removing the wheels, and it consists in the construction, combination and arrangement of devices hereinafter described and claimed.

One object of my invention is to provide an improved block which may be permanently or otherwise secured on an axle on the inner side of the collar thereof, and having a clean-out recess providing a shoulder, an opening, one side of which communicates with said recess at said shoulder and which opening also communicates with the lubricant conducting groove in the upper side of the axle and spindle, and a closure for said opening removable therefrom, said construction of the recess and of the said opening adapting the spout of an oil can or ejector to be inserted through said opening and into said lubricant conducting groove for the purpose of introducing oil or other lubricant to the said groove.

A further object is to combine with said block a cover for such recess, removable from such block, and secured detachably thereto by means of such closure.

A further object is to provide means to prevent such cover from rattling.

A further object is to provide a longitudinal lubricant conducting groove in the upper side of an axle spindle, and lubricant distributing grooves extending laterally from such longitudinal grooves to convey lubricant to the surface of such spindle.

In the accompanying drawings, Figure 1 is a side elevation of a portion of an axle constructed in accordance with my invention and provided with my improved invention or attachment; Fig. 2 is a longitudinal sectional view of the same with the closure or plug and the cover removed, and a can, shown with its spout inserted through the opening in the block and in the longitudinal groove of the axle spindle; Fig. 3 is a similar view, showing the cover closed; Fig. 4 is a transverse sectional view taken on the plane indicated by the line *a*—*a* of Fig. 1; Fig. 5 is a similar view taken on the plane indicated by the line *b*—*b* of Fig. 1; Fig. 6 is a perspective view of a portion of the axle with the tree thereof and the cover of the block removed; Fig. 7 is a detail inverted perspective view of the block; and Fig. 8 is a detail elevation of an oiler or can of special construction adapted for use in connection with my invention.

The steel axle, 1, has the usual tapering spindle 2 at its end, and between said spindle and the square portion of the axle is the flanged collar 3, having an outwardly-facing annular groove 4, into which the inner end of the boxing of the wheel fits and turns. The wooden tree 5 terminates short of the collar 3 and forms a shoulder 6. A clip 7, of the usual construction, is here shown to secure the tree on the square portion of the steel axle. The tree may be dispensed with within the scope of my invention, and I do not consider myself limited in this particular.

In the upper side of the spindle is a longitudinal oil or other lubricant conducting and receiving groove, 8, which extends nearly to the outer end of the spindle to the shoulder, 9, against which the usual nut abuts, which is secured on the reduced threaded portion, 10. The said groove also extends across and through the collar 3 along that portion of the axle which is between the shoulder, 6, and said collar, the inner end, 11, of the said groove being terminated in rear of and suitably remote from the collar 3. On one side of the groove 8 are lubricant distributing grooves 12 which extend laterally and obliquely therefrom, which are comparatively short and which serve to feed the oil or lubricant from the groove 8 to the surface of the spindle, as the wheel revolves thereon, said grooves 12 diminishing in depth toward their outer ends.

On the square portion of the axle at the inner side of and abutting against the collar 3 is a lubricating attachment 13, which consists of a metallic block, which may be wrought, cast or otherwise constructed. The said block is preferably of such length as to fit between the collar 3 and the shoulder 6, and preferably its breadth corresponds with that of the square portion of the axle. In the upper side of said block is a recess 14 which extends transversely thereof from side to side, and one side of which recess presents a shoulder 15, which rises from the axle. Formed in the block at the forward end of the recess is a vertical internally threaded opening 16 one side of which is co-incident with and partly exposed by the shoulder, 15. The block is further provided on its underside with a longitudinal channel 17, which communicates both with the opening 16 and with the inner portion of the groove 8. The shoulder 15, opening 16 and channel 17 enable the bent spout, c, of an oil can or ejector, d, to be inserted through them and into the groove 8, and extend a considerable distance in said groove 8 to convey oil or other lubricant thereto at a point near the distributing grooves 12. The recess 14 affords clearance for the said spout to facilitate its introduction to and removal from such groove 8, as will be understood by reference to Fig. 2. The opening 16 is screw threaded and a closure 18, which is here shown as a screw plug is provided for insertion in the said opening to close the inner end of the groove 8 after the latter has been supplied with lubricant. Said plug 18 has an enlarged or flanged head 19. Within the scope of my invention, the recess 14 opening 16 and channel 17 to communicate with the inner end of the groove 8 may be formed or provided by any suitable means or manner, on the upper side of the axle, and I do not limit myself in this particular. Such recess opening and channel are here shown as made in and provided by the block 13; which block may be brazed or otherwise secured to the upper side of the axle.

In order to exclude dirt from the recess 14 and opening 16 I provide a cover 20 which is in practice preferably made of sheet or plate metal, is of considerable length and width and is of substantially inverted U-shape in cross-section, to provide an upper portion 21 to cover the recess 14 and partially cover the block 13 and to further provide side portions, 22, to close the ends of said recess 14 and bear against the sides of said block 13. The length of the said cover is such that the same when in place bears at one end on the shoulder 23 formed by the recess 14 opposite the shoulder 15. Such end of the cover is provided with a pad 24 on its underside to bear on such shoulder 23 and said pad is here shown as secured in place by means of a bolt 25. It may otherwise be secured within the scope of my invention, and I do not desire to limit myself in this particular. The cover 20 is further provided with an opening 26, which corresponds in diameter with the opening 16 and registers therewith when the cover is in place, and it will be understood that the plug or closure 18 which is employed to close the opening 16, and, hence, the inner end of the groove 8 also serves to firmly and yet detachably secure such cover on the block 13, since the flange head 19 of such plug, when the latter is screwed down, bears on the upper side of such cover; such screw plug also serves to force the cover downwardly and apply such pressure on the pad 24 as to cause the latter to effectually close the space between the end of the cover and shoulder 23 of the block, and, hence, prevent the dirt particles from entering the recess 14.

The block 13 forms in effect an enlargement on the upper side of the axle to provide a shoulder and recess to afford clearance for the bent spout of an oil can or ejector, and an opening through which the same may be inserted to reach and extend into the longitudinal lubricant receiving groove of the axle spindle.

To facilitate the manufacture of the axle and enable my invention to be applied to axles of ordinary construction, the block 13 is preferably formed with such recess, shoulder and opening, and is preferably made separate from and attached to the axle in the manner shown, but I would have it understood that I do not limit myself in this particular.

Having thus fully described my invention, what I claim as new, and desire to secure by Letters-Patent, is:

1. In combination with an axle having a longitudinal lubricant receiving groove or channel, a block for attachment to such axle to cover the inner end of said groove or channel and having a clean-out recess, a shoulder at one side of said recess, an opening communicating with said recess at such shoulder and also with said groove or channel, a closure for said opening, and a cover for said recess, said closure constructed and co-acting with said cover to detachably secure the latter in place.

2. An axle having a longitudinal lubricant receiving groove and further provided with an offset covering the inner end of said groove, said offset having a clean-out recess and presenting shoulders at opposite sides of said recess and further provided with an opening extending from one of said shoulders to the said groove or channel, a covering for said recess to bear on said offset and the outer shoulder thereof, and a closure for said opening, said closure constructed and co-acting with said cover to secure the latter detachably in place on said offset from said recess.

3. An axle having a longitudinal lubricant-receiving groove, a block provided on the axle at the rear end of said groove and having an internally threaded opening and a recess in rear of and communicating with said opening, the latter being disposed over the rear end of the groove, a cover applied to the block for closing the recess and having an opening in register with said threaded opening, and a screw block for closing the latter and removably securing the cover in place.

In testimony whereof I have hereunto set my hand in presence of two subscribing witnesses.

JOSEPH ADEN.

Witnesses:
J. W. GARNER,
L. O. HILTON.